Aug. 25, 1953  R. T. SPEDDING  2,649,721
POSITIONING MECHANISM FOR LIFT TYPE IMPLEMENTS
Filed April 12, 1950
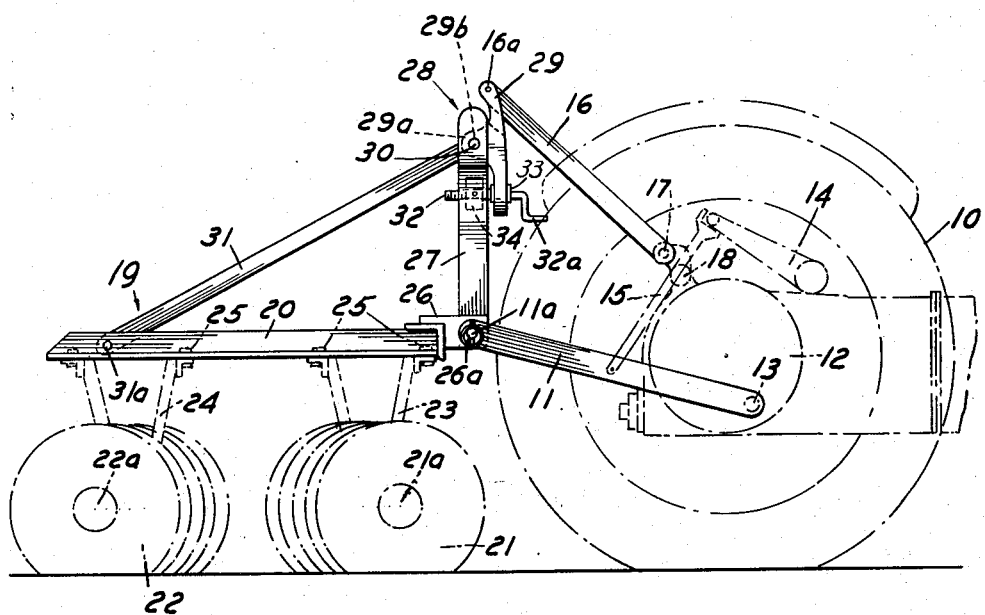
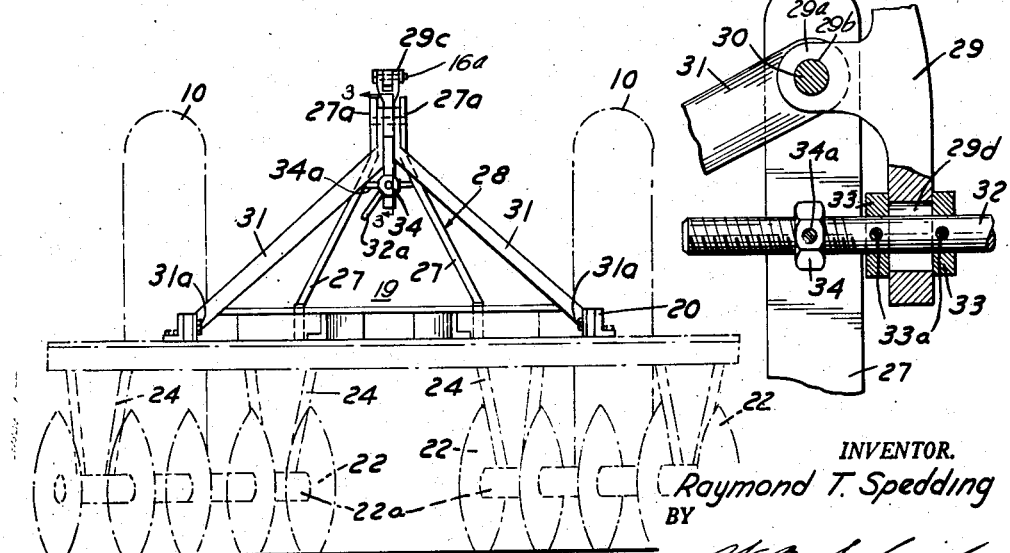
INVENTOR.
Raymond T. Spedding
BY
ATTORNEY Patented Aug. 25, 1953

2,649,721

UNITED STATES PATENT OFFICE 2,649,721

POSITIONING MECHANISM FOR LIFT
TYPE IMPLEMENTS

Raymond T. Spedding, Detroit, Mich., assignor to
Dearborn Motors Corporation, Highland Park,
Mich., a corporation of Delaware Application April 12, 1950, Serial No. 155,398

2 Claims. (Cl. 97—47.62)

This invention relates to a leveling mechanism for lift-type implements adapted for mounting on a tractor having power lifted hitch links.

When using certain types of implements adapted for mounting on the power lifted hitch linkage of a tractor, it is frequently not possible to level such implement in a longitudinal direction due to the inherent inflexibility of the linkage system. Consequently, if the implement is not capable of being leveled, the implement will not work the ground evenly. This is particularly true in the case of a disc harrow wherein front and rear gangs are utilized for tilling the soil. If the gangs are not in the same horizontal plane, one of such gangs will then bite more deeply into the earth thus placing a substantially greater proportion of the work on such gang with resultant unevenness of harrowing and other attendant shortcomings. In the case of the offset type of disc harrows, such leveling adjustment is necessary to eliminate side draft.

Accordingly, it is an object of this invention to provide an improved positioning mechanism for lift type implements of the type utilized with tractors having power lifted hitch links.

A particular object of this invention is to provide a leveling mechanism for a lift type harrow for convenient leveling of such harrow from the tractor seat when mounted on the hitch linkage of a tractor.

A further object of this invention is to provide a leveling mechanism for lift type implements which is readily adaptable to existing equipment and which is of simple construction for ease and cheapness of manufacture.

The specific nature of this invention as well as other objects and advantages thereof, will become apparent to those skilled in the art from the following detailed description, taken in conjunction with the attached sheet of drawings, on which, by way of preferred example only, is illustrated one embodiment of this invention.

Figure 1 is a side elevational view showing a disc harrow mounted on the linkage system of a tractor and incorporating the positioning mechanism of this invention.

Figure 2 is a rear elevational view of the device of Figure 1.

Figure 3 is an enlarged sectional view taken along the plane 3—3 of Figure 2.

As shown on the drawings:

This invention is utilized with farm implements, and particularly disc harrows, adapted for mounting on the power lifted, three point hitch linkage system of a tractor of well known make.

Briefly, such invention comprises a positioning lever medially pivoted to a frame element of the implement. One end of such lever is pivotally connected to one of the hitch links of the tractor linkage system. A screw member operable by a crank is connected between the frame element and the other end of the lever for variably angularly positioning such lever relative to the frame, thus changing the effective length of the hitch link and thereby adjusting the longitudinal angular position of the disc harrow with respect to the ground.

In Figure 1 there is shown the rear end portion of a tractor 10 of a well known make having a pair of transversely spaced, vertically swingable, draft links 11 pivoted to the axle housing 12 as shown at 13. Draft links 11 are respectively vertically lifted by a pair of lift arms 14 operable by a hydraulic ram (not shown) located within the tractor. Lift arms 14 are respectively connected to draft links 11 by connecting rods 15. A top link 16 is pivotally secured as at 17 to an L-shaped lug member 18 provided on the top of axle housing 12. In Figure 1, there is shown a lift type tandem disc harrow 19 having fixed angle disc gangs mounted on the trailing draft links 11 of tractor 10. It will be appreciated, however, that the positioning or leveling mechanism of this invention can be utilized with other types of lift implements.

The tandem disc harrow 19 comprises a rigid frame 20 disposed transversely of the tractor and having depending front and rear disc gangs 21 and 22. Disc gangs 21 and 22 are respectivelyl provided with shafts 21a and 22a and such shafts are respectively rotatably supported in brackets 23 and 24 secured to frame 20 in depending relationship by bolts 25. On the leading edge of frame 20 there is welded a pair of forwardly projecting, transversely spaced lugs 26. A pair of upwardly and inwardly bent strap members 27 are respectively secured by transverse link mounting pins 26a to the lugs 26 to define what is generally called an A-frame 28. Draft links 11 are respectively mounted on pins 26a and are secured thereto by linch pins 11a. Each strap member 27 terminates in a vertical end portion 27a and such end portions are transversely spaced to mount a lever 29 as will be presently described. A-frame 28 is supported in a vertical position by a pair of rearwardly and downwardly sloping brace members 31 connected at their lower ends to frame 20 as by bolts 31a, as best shown in Figure 2.

Lever member 29 having an integral rearwardly projecting lug 29a disposed substantially centrally thereof, is vertically mounted between the top end portions 27a of strap members 27. A transverse hole 29b is provided in lug 29a and a pin 30 transversely supported by the top end portions 27a of strap members 27 and the upper ends of brace members 31 within suitable apertures in such members, passes through hole 29b to pivotally mount lever 29 at the top of A-frame 28. The upper end of lever 29 is forked as shown at 29c in Figure 2 to receive the rear end of upper tractor link 16 which is pivotally secured within the forked end 29c by a transverse pin 16a as shown in Figure 2.

A screw member 32 having a forward crank portion 32a is provided to adjust the angular position of lever 29 about pin 30 and such screw passes through a transverse hole 29d provided in the lower end portion of lever 29. Hole 29d is substantially larger than the diameter of screw shaft 32 for a purpose to later appear. A pair of collars 33 are respectively secured on screw member 32 by radial pins 33a and disposed on opposite sides of lever 29 to rotatably secure such screw to lever 29. A nut 34 is rotatably mounted between the strap members 27 of A-frame 28 by a pair of diametrically opposed stud shafts 34a welded to such nut and such studs are respectively rotatably supported within suitable horizontal apertures in strap members 27. Screw member 32 threadably engages nut 34, hence rotation of crank 32a pivots lever 29 about pin 40.

In the operation of the improved leveling device of this invention, if the bottom edges of the two disc gangs 21 and 22 are not in the same horizontal plane when lowered to a ground working position as shown in Figure 1, the gangs may then be conveniently brought to the same level by rotating crank 32a to change the angular position of A-frame 28 and hence, of the entire implement. Such operation of crank 32a may be accomplished from the tractor seat. Thus the upper link connection is, in effect, lengthened or shortened, and the rear end of frame 19 may be elevated or depressed to horizontally align the gangs 21 and 22. Hole 29d in lever 29 is of enlarged diameter to permit the pivotal movement of such lever relative to screw crank 32 without interference.

It will, therefore, be clear from the above description that there is here provided an improved implement positioning or leveling device which will quickly and conveniently change the longitudinal angular position of a lift type implement. It is obvious that the leveling mechanism of this invention is easily applied to existing lift type implements used with tractors having a three point hitch linkage and also that such leveling device may be economically manufactured.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of transversely spaced, vertically swingable, power lifted, draft links and a top link centrally pivoted to the tractor, an implement having a frame including an upstanding rigid A-frame, means for pivotally connecting the implement frame to the tractor draft links, a positioning lever medially pivotally mounted on the top portions of said A-frame, means for pivotally connecting one end of said positioning lever to the tractor top link and means operable between the other end of said positioning lever and said A-frame for adjusting the angular position of said positioning lever relative to said A-frame.

2. A positioning mechanism for lift type implements of the type connectable to a tractor by two draft links and a top link and having an upstanding rigid frame structure, comprising a lever having medially disposed means thereon for pivotal connection to the upstanding frame structure of the implement, means on one end of said positioning lever for pivotally connecting to the tractor top hitch link, and adjusting means carried by the other end of said lever and engageable with said upstanding frame structure for adjusting the angular position of said lever relative to said frame structure.

RAYMOND T. SPEDDING.

References Cited in the file of this patent

UNITED STATES PATENTS

| Number | Name | Date |
|---|---|---|
| 2,309,750 | Carrington | Feb. 2, 1943 |
| 2,440,550 | Martin | Apr. 27, 1948 |
| 2,462,588 | Wondra | Feb. 22, 1949 |